US006845304B1

(12) United States Patent
Young

(10) Patent No.: US 6,845,304 B1
(45) Date of Patent: Jan. 18, 2005

(54) METHOD OF AND SYSTEM FOR DERIVING INERTIAL-AIDED DEVIATIONS FOR AUTOLAND SYSTEMS DURING GPS SIGNAL INTERRUPTIONS

(75) Inventor: Shih-Yih R. Young, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/664,251

(22) Filed: Sep. 17, 2003

(51) Int. Cl.[7] .................................................. G06G 7/78
(52) U.S. Cl. ........................... 701/16; 701/17; 701/220; 342/33; 340/945
(58) Field of Search ........................... 701/16, 17, 220; 342/33–35; 340/945, 972

(56) References Cited

U.S. PATENT DOCUMENTS 5,216,611 A * 6/1993 McElreath .................. 701/221

6,178,363 B1  1/2001 McIntyre et al.

* cited by examiner

Primary Examiner—Yonel Beaulieu
(74) Attorney, Agent, or Firm—Nathan O. Jensen; Kyle Eppele

(57) ABSTRACT

Deriving inertial-aided deviations for autoland systems during GPS signal interruptions involving an inertial reference system and a GPS landing system can include converting position coordinates of an aircraft from the inertial reference system to runway, lateral, and vertical coordinates. After this conversion, the method calibrates runway distance and lateral distance based on the converted position coordinates from the inertial reference system using runway distance and lateral distance from the GPS landing system with a third-order calibration filter when the aircraft is below a first height above terrain and calibrates vertical distance based on the converted position coordinates from the inertial reference system using vertical distance from the GPS landing system with a second-order calibration filter when the aircraft is below the first height above terrain. The method uses the calibrated runway, lateral, and vertical distances for deviation computations when GPS signals are interrupted below a second height above terrain.

20 Claims, 4 Drawing Sheets

METHOD OF AND SYSTEM FOR DERIVING INERTIAL-AIDED DEVIATIONS FOR AUTOLAND SYSTEMS DURING GPS SIGNAL INTERRUPTIONS

FIELD OF THE INVENTION

The present invention relates to methods and systems for providing navigation information for airplanes during initial and terminal phases of flight. More specifically, the present invention relates to methods and systems for deriving inertial-aided deviations for autoland systems during GPS signal interruptions.

BACKGROUND OF THE INVENTION

Automatic Landing Systems (i.e., autopilots) on conventional commercial airplanes receive guidance from a ground-based Instrument Landing System (ILS). In inclement weather, the integrity and continuity of the ILS transmissions are crucial to the safety of the airplane during the final phase of approach, touchdown, and roll-out. "Integrity" is the probability that the signals are not hazardously misleading. "Continuity" is the probability that the signals remain present and usable during the approach. The integrity is assured by a set of near-field and far-field monitors, ready to shut down the ILS should the ILS signals move outside allowed tolerances. The continuity of the signals is assured by a backup transmitter. The backup transmitter comes on-line if the primary transmitter fails or is shut down. In conventional systems, the ground station has the sole responsibility for ensuring the integrity and continuity of its own transmissions.

ILSs are only practical at airfields that have large incomes generated by commercial traffic or government finding because ILS equipment is costly due to initial purchase price and maintenance costs. Also, ILS signals are sensitive to local building construction and even vehicle movement. This sensitivity increases operating costs, because the ILS operators, such as the Federal Aviation Administration (FAA), must continually ensure each ILS is producing an accurate signal.

Global Positioning System (GPS) Landing System (GLS) has been provided as a replacement for ILS. GLS uses satellite signals that are present at no cost to airports or other authorities responsible for providing airplane approach information. In present GLSs, airplane position signals, determined from GPS signals sent by orbiting satellites, are augmented in the airplane by differential corrections (differential GPS) received from a local ground station. The differentially corrected GPS signals are referenced to an intended approach path received by the airplane from the same ground station. The ground station is also responsible for monitoring each satellite and providing airplanes with the integrity status of each satellite. The integrity and continuity of the received airplane position signals depend on the number of satellites in the airplane's field of view, the satellites' positions in the sky (their "geometry"), and the data received from the ground station. The airplane's on-board equipment must determine that the signals being received from satellites and ground station will provide a level of integrity and continuity compatible with the prevailing approach weather minimum for the duration of the approach about to be performed.

Even when the satellite geometry supports the required continuity and integrity, the signals received by airplanes are subject to environmental threats, such as electromagnetic interference (EMI) (both accidental and malicious), lightning and ionospheric scintillation (i.e., brown-outs associated with sunspot activity). There is also the threat of random satellite failures and satellites setting over the horizon. These threats can affect the reception of some or all of the available satellite signals, resulting in degradation or loss of guidance.

When satellite signals are interrupted, many seconds may be needed to re-acquire and track their signals. During GPS signal interruption, positional deviations from the desired flight path cannot be computed and provided to the autoland system by the GLS.

Some conventional autoland systems have the ability to coast solely on navigation data provided by the Inertial Reference Systems (IRS) for lateral and vertical flight control. Such inertial coasting is only possible for a period of 10 seconds. However, the GPS signal interruption can be as long as one or two minutes, which is much longer than the tolerable coasting time by autoland systems. For a CAT II/III autoland system operating in the GLS environment, it must provide continuous operations from Alert Height through rollout even during interruptions of GPS signals. As such, GPS signal interruptions for more than 10 seconds pose a problem in terms of continuity for the CAT II/III autoland systems.

Several methods of enhancing GLS for providing acceptable signals for autoland approaches have been proposed. One method is to enhance the satellite constellation by making use of more satellite systems, such as the Russian GLONASS system. This approach places an added burden on the airborne equipment and has complex political implications. Another method uses so-called "pseudolites," ground-based transmitters, located on or near the airport, which mimic satellites by providing additional range information to the airplane. Similar to ILS, this approach is impractical, because it entails large equipment expenditures and maintenance costs in addition to those of the differential GPS ground station. Also, neither of these approaches adequately addresses the environmental and other threats described above, which may produce unreliable GLS data for an indefinite period of time.

One proposed solution is described by U.S. Pat. No. 6,178,363 entitled "Inertially augmented GPS Landing System" and assigned to the Boeing Company. The Boeing system utilizes an algorithm operating with the GPS GLS and IRS to achieve inertial coasting performance during GPS signal interruptions while limiting computational burden. There are limitations, though, to this algorithm. Accordingly, an alternative to the Boeing algorithm is needed.

SUMMARY OF THE INVENTION

The present invention includes embodiments that derive inertial-aided deviations for autoland systems during GPS signal interruptions. An exemplary embodiment includes an airplane guidance method involving an inertial reference system and a GPS landing system. The airplane guidance method includes converting position coordinates of an aircraft from the inertial reference system to runway, lateral, and vertical coordinates; calibrating runway distance and lateral distance based on the converted position coordinates from the inertial reference system using runway distance and lateral distance from the GPS landing system with a third-order calibration filter when the aircraft is below a first height above terrain; calibrating vertical distance based on the converted position coordinates from the inertial reference system using vertical distance from the GPS landing system with a second-order calibration filter when the aircraft is below the first height above terrain; and using the calibrated runway, lateral, and vertical distances for deviation computations when GPS signals are interrupted below a second height above terrain.

Another exemplary embodiment relates to a method of deriving inertial-aided deviations for autoland systems during GPS signal interruptions. The method includes generating global positioning positions, generating inertial reference system positions, and generating calibrated positions based on the global positioning positions and the inertial reference system positions using a third-order calibration filter and a second-order calibration filter.

Still another exemplary embodiment relates to a system for deriving inertial-aided deviations for autoland systems during GPS signal interruptions. The system includes a first component for generating global positioning positions, a second component for generating inertial reference system positions, a third component for generating calibrated positions based on the global positioning positions and the inertial reference system positions using a third-order calibration filter and a second-order calibration filter, and a fourth component for providing airplane control signals using deviation computations from the calibrated positions when the calibration filters converge.

BRIEF DESCRIPTION OF THE DRAWINGS

The exemplary embodiments will be described with reference to the accompanying drawings, wherein like numerals denote like elements.

DETAILED DESCRIPTION OF EXEMPLARY EMBODIMENTS

Figure 1:
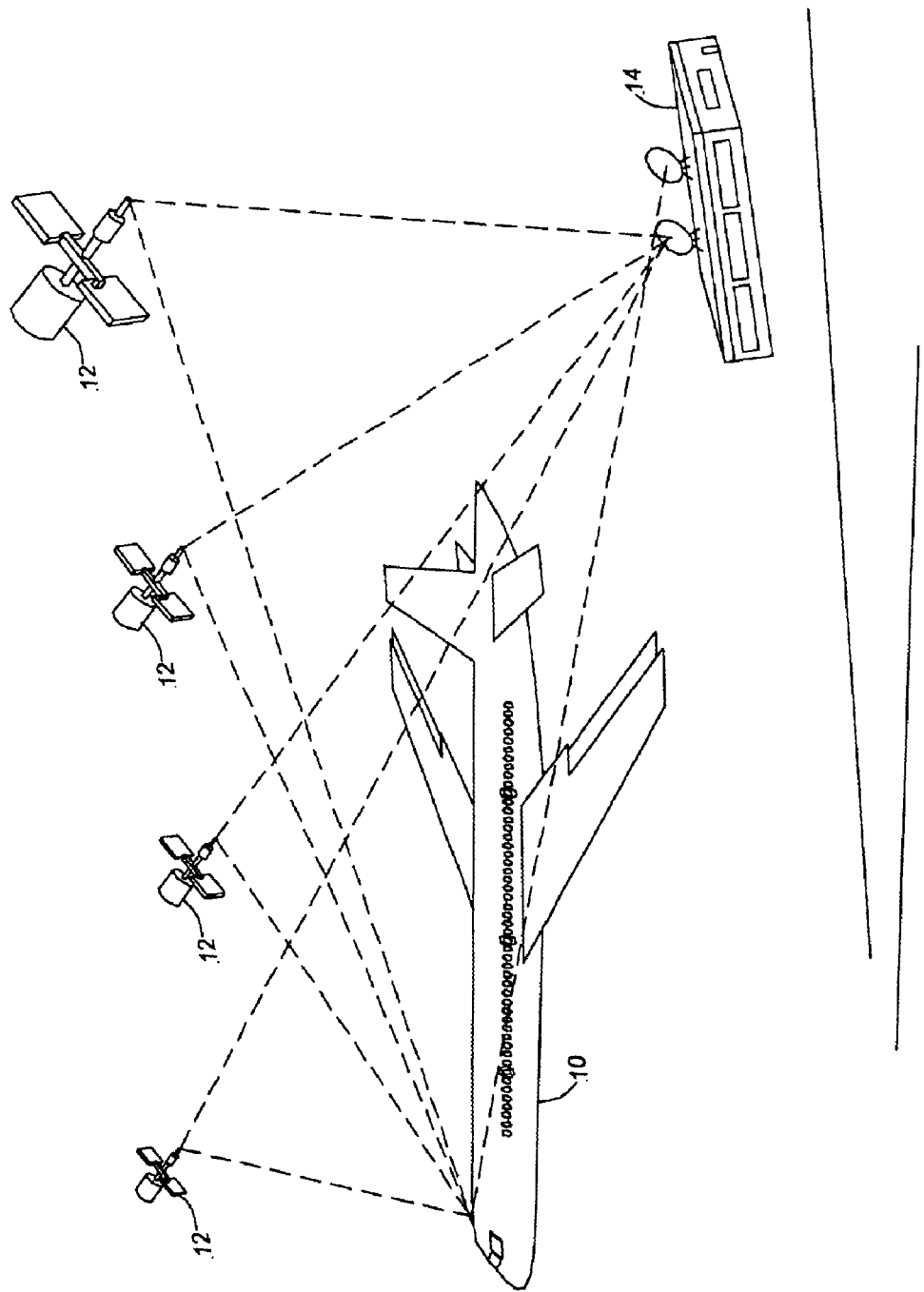
FIG. 1 is a diagram of an aircraft having an aircraft precision approach guidance system in accordance with an exemplary embodiment.

Referring to FIG. 1, an exemplary airplane precision approach guidance system including a Global Positioning System (GPS) Landing System (GLS) augmented with an Inertial Reference System (IRS) is provided in an aircraft 10. In the following description, for purposes of explanation, numerous specific details are set forth to provide a thorough understanding of exemplary embodiments of the invention. It will be evident, however, to one skilled in the art that the invention may be practiced without these specific details. In other instances, well-known structures and devices are shown in block diagram form to facilitate description of the exemplary embodiments.

Figure 2:
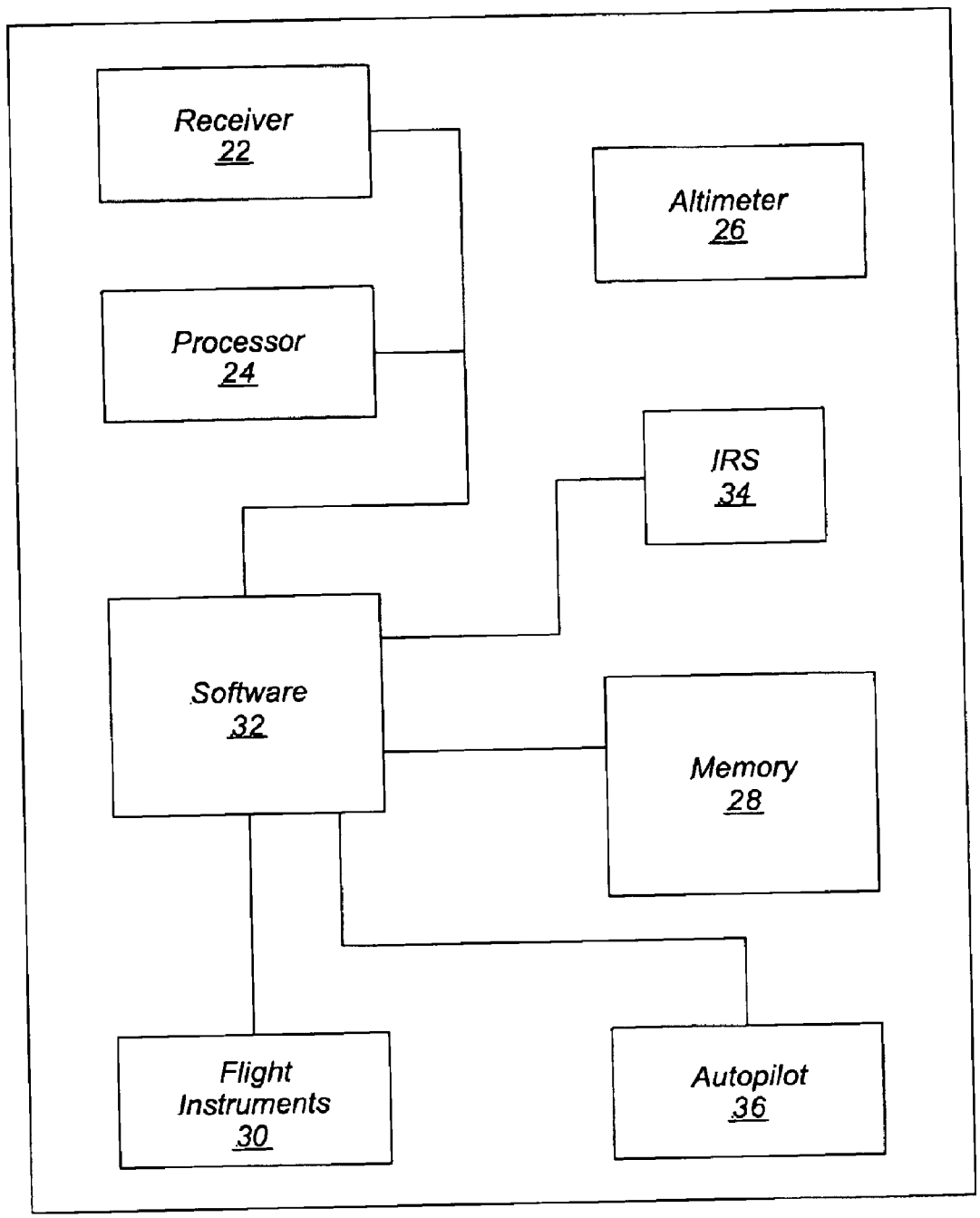
FIG. 2 is a diagram of an exemplary aircraft precision approach guidance system in accordance with an exemplary embodiment.

FIG. 1 illustrates that the aircraft 10 receives signals from satellites 12 and a ground station 14. FIG. 2 illustrates that the exemplary airplane precision approach guidance system includes a GPS receiver 22 and a GLS processor 24 that receive and process signals from satellites 12 and the ground station 14. The guidance system in the aircraft 10 also includes an altimeter 26, a memory 28, flight instruments 30, software 32, and Inertial Reference System (IRS) 34, and an autopilot system 36.

In an exemplary embodiment, the software 32 executes instructions contained in the memory 28 on a processing unit. The software 32 may be a program or subroutine included in the program that controls the operation of the GPS receiver 22, the IRS 34, or the autopilot system 36. Alternatively, the software 32 could execute on a separate, stand-alone processor. For ease of illustration and description, the guidance software is depicted and described as a separate element or component. The instructions of the software 32 may be loaded into a random access memory (RAM) for execution by the processing unit from a read-only memory (ROM), a mass storage device, or some other persistent storage. In other embodiments, hardwired circuitry may be used in place of, or in combination with, software instructions to implement the exemplary embodiments. Thus, the embodiments described herein are not limited to any specific combination of hardware circuitry and software, nor to any particular source for the instructions executed by the computer system.

The autopilot system 36 utilizes data from the IRS 34 to coast accurately during an interruption of signals from the ground station 14 or GPS satellites 12. Data from the IRS 34 can also be used with GLS data from satellites 12 to enable the aircraft 10 to coast accurately for a longer period of time. However, data from satellites 12 may not always be available. Such data may be unavailable for periods because of satellite failure, lack of an appropriate number of satellite signals, electromagnetic interference, lightning, or other interruptions. The period of time that the GLS may not produce guidance signals can be several minutes, thereby requiring the airplane's autopilot to coast for a period up to a minute or so on an approach.

The GPS receiver 22 receives position information from the satellites 12 and receives differential position information and runway approach path coordinates from the ground station 14. If the received position information is determined to be acceptable for guidance, the GLS processor 24 processes the received position information and generates GLS guidance signals.

The guidance software 24 processes the GLS guidance signals, guidance information generated by the IRS 20, and guidance information generated by the radio altimeter 18. Based on the information it receives, the guidance software generates guidance information for the flight instruments 26 and the autopilot system 28. When the received GLS position information is determined to be unacceptable, the lateral control guidance information reverts to IRS generated information adjusted using bias estimates calculated during the period of time when the GLS signal was known to be healthy. The type of GLS and IRS guidance information and the type of guidance information produced by the guidance software executed by the processor of the GIS receiver 12, the IRS 20 or the autopilot system 38, or a stand-alone guidance processor, is described in more detail below.

Figure 3:
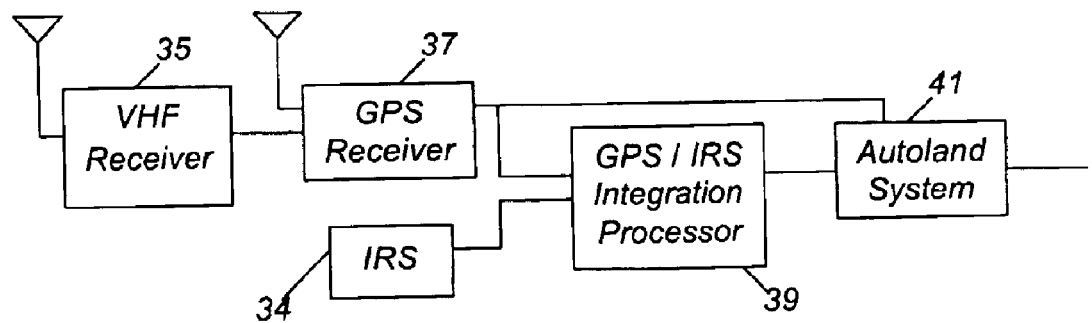
FIG. 3 is a general block diagram illustrating an aircraft precision approach guidance system in accordance with an exemplary embodiment.

FIG. 3 illustrates an exemplary GPS/IRS integration approach in an aircraft precision approach guidance system. A VHF receiver 35 provides GPS differential corrections and landing waypoint information to a GPS receiver 37. The GPS receiver 37 and IRS 34 provide aircraft GLS position and inertial velocity to an integration processor 39.

The integration processor 39 provides positional deviations to an autoland system 41 during both normal operations and GPS signal interruptions. The integration processor 39 may be hosted in the GPS receiver 37 or the IRS 34.

Figure 4:
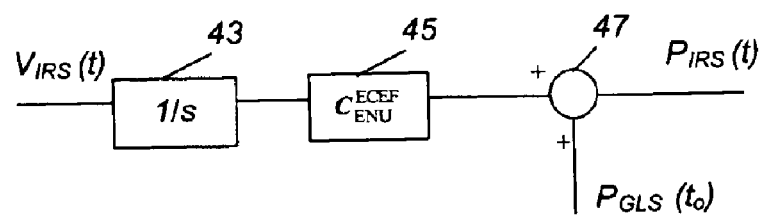
FIG. 4 is a diagram illustrating processing operations for exemplary inertial reference trajectory determination in accordance with an exemplary embodiment.
Figure 5:
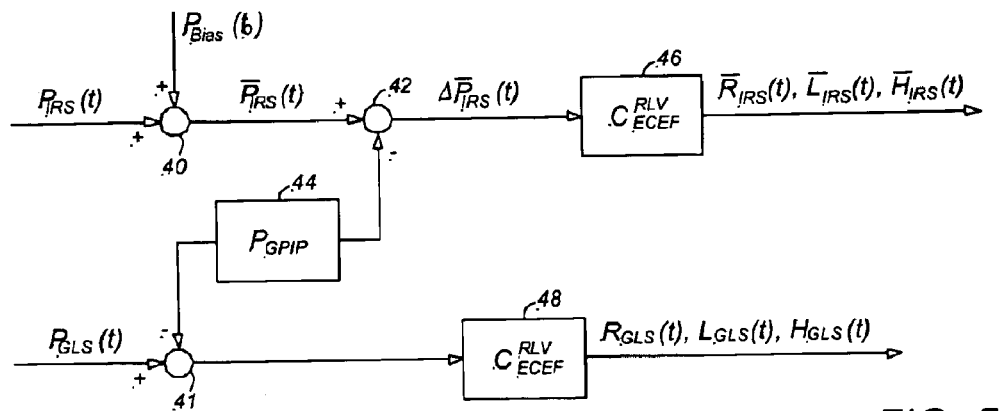
FIG. 5 is a diagram illustrating processing operations for an exemplary coordinate conversion process.
Figure 6:
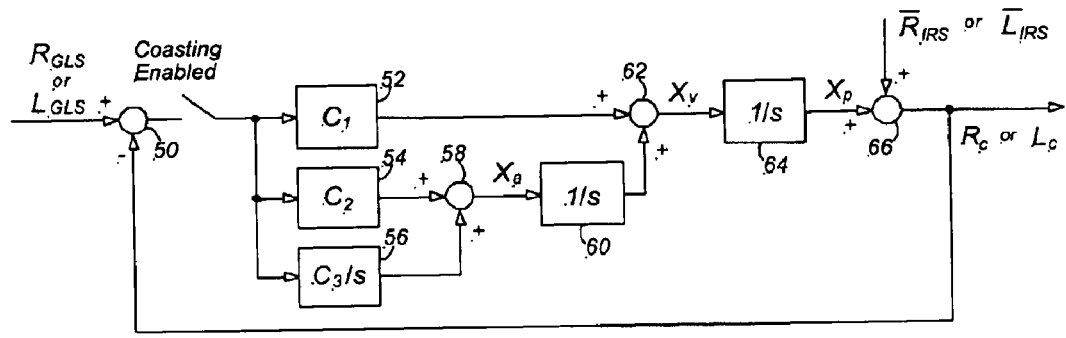
FIG. 6 is a diagram illustrating processing operations for exemplary calibration and coasting processes using a third-order filter in accordance with an exemplary embodiment.
Figure 7:
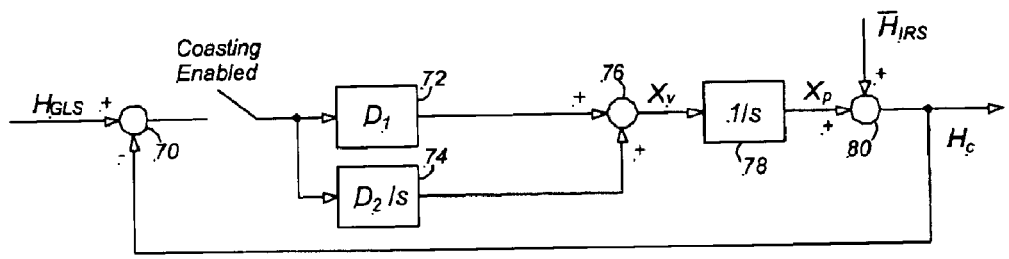
FIG. 7 is a diagram illustrating processing operations for exemplary calibration and coasting processes using a second-order filter in accordance with an exemplary embodiment.

An exemplary embodiment for deriving inertial-aided deviations can be performed by determining a reference trajectory (FIG. 4), converting position coordinates (FIG. 5) and calibrating the converted position coordinates (FIGS. 6 and 7). FIG. 4 illustrates processing operations for an exemplary reference trajectory determination process. A reference trajectory is computed for the inertial horizontal position based on the inertial horizontal velocity. Further, altitude is computed based on a baro-damped inertial vertical velocity because altitude provided by the IRS 34 can be noisy.

In an exemplary determination process, an integrator 43 is used to integrade the IRS velocity at a time t, $V_{IRS}(t)$. The result of the integrator 43 is provided to a transformation matrix 45, which transforms or converts local ENU (East North Up) positions to ECEF (Earth Centered, Earth Fixed) positions. An adder 47 adds the transformed position to a GLS ECEF position at the start of calibration, $t_o$, with $t_o<t$. The adder 47 results in an IRS ECEF position at time t, $P_{IRS}(t)$.

FIG. 5 illustrates processing operations for an exemplary coordinate conversion process from ECEF (Earth Centered, Earth Fixed) positions to RLV (Runway, Lateral, and Vertical) coordinates. The ECEF positions are first compensated using an estimated initial position bias. In an exemplary conversion process, an adder 40 combines an IRS ECEF (Earth Centered, Earth Fixed) position at time t ($P_{IRS}(t)$) with a position bias ($P_{BIAS}(t_0)$) based on a calibration start time ($P_{BIAS}(t_0)=P_{GLS}(t_0)-P_{IRS}(t_0)$). The output of adder 40 ($\overline{P}_{IRS}(t)$) is reduced by a Glidepath Intercept Point ECEF position ($P_{GPIP}$) using a subtractor 42, resulting in $\Delta \overline{P}_{IRS}(t)$. This output is transformed using a transformation matrix 46 that converts ECEF positions to RLV positions, resulting in values for runway distance ($\overline{R}_{IRS}(t)$), lateral distance ($\overline{L}_{IRS}(t)$), and height ($\overline{H}_{IRS}(t)$) based on compensated IRS data in the RLV coordinates.

A subtractor 41 reduces a GLS ECEF position at time t ($P_{GLS}(t)$) by the Glidepath Intercept Point ECEF position ($P_{GPIP}$). The result from subtractor 41 is transformed using a transformation matrix 48. This transformation results in values for runway distance ($R_{GLS}(t)$), lateral distance ($L_{GLS}(t)$), and height ($H_{GLS}(t)$) based on the GLS data in the RLV coordinates.

FIGS. 6 and 7 illustrate processing operations for exemplary calibration and coasting processes. When the aircraft 10 is below 1500-foot HAT (height above terrain), the runway distance and lateral distance based on the compensated IRS position are calibrated by the GLS runway distance and lateral distance with a third-order calibration filter, as shown in FIG. 6. When the aircraft is below 1500-foot HAT, the vertical distance based on the compensated IRS position is calibrated by the GLS vertical distance with a second-order calibration filter, as shown in FIG. 7. When the GPS signals are interrupted below 200-foot HAT and all calibration filters have converged, the calibrated RLV distances are used for deviation computations. In an exemplary embodiment, the third-order calibration filter is considered converged when the error signal is within 0.15 m for 30 seconds, and the second-order calibration filter is considered converged when the error signal is within 0.2 m for 30 seconds.

FIG. 6 illustrates a third-order calibration filtering system used in calculating runway distance or lateral distance in the exemplary airplane precision approach guidance system. In this filtering system, a subtractor 50 reduces measured runway distance ($R_{GLS}$) or lateral distance ($L_{GLS}$) by calibrated runway distance ($R_c$) or lateral distance ($L_c$). When coasting is not enabled, this difference value (or error between the measured and calibrated values) from the subtractor 50 is calibrated using filters 52, 54, and 56.

The results of filters 54 and 56 are summed by an adder 58 to obtain an acceleration error state ($X_a$). An integrator 60 converts the acceleration error state to a velocity by an integration operation, I/S. This velocity is added to the results of filter 52 using an adder 62 to obtain a velocity error state ($X_v$). Preferably, $X_v$ is initialized by the velocity difference between GLS and IRS in the RLV coordinates. An integrator 64 converts the velocity error state to a position error state ($X_p$). An adder 66 adds the position error state ($X_p$) derived from the GLS measurements and the measurement of runway distance ($R_{IRS}$) or lateral distance ($L_{IRS}$) from the IRS to obtain a calibrated runway distance ($R_c$) or lateral distance ($L_c$).

FIG. 7 illustrates a second-order calibration filtering system used in calculating height in the exemplary airplane precision approach guidance system. In this filtering system, a subtractor 70 reduces measured height ($H_{GLS}$) by a calibrated height ($H_c$). When coasting is not enabled, the result from the subtractor 70 is calibrated using filters 72 and 74. The results of filters 72 and 74 are added by an adder 76 to obtain a velocity error state ($X_v$). Preferably, $X_v$ is initialized by the velocity difference between GLS and IRS in the RLV coordinates. The velocity error state is integrated by integrator 78 to obtain a position error state ($X_p$). An adder 80 adds the position error state ($X_p$) derived from the GLS measurements and the measurement of height ($H_{IRS}$) to obtain a calibrated height ($H_c$).

In an exemplary embodiment, GLS and IRS values are buffered for a period of time, such as two seconds. This buffering allows any hazardously misleading information to be identified by the GLS before the information is used by the calibration filters. Thus, advantageously, the integrity of the inertial-aided deviations can be ensured and enabled for use with safety-critical applications. In an embodiment where the calibration filters are used, the GPS and IRS values are old (e.g., two seconds delayed). As such, when coasting is enabled, error states are propagated forward by two seconds.

It is understood that although the detailed drawings and specific examples describe exemplary embodiments of methods and systems for deriving inertial-aided deviations for autoland systems during GPS signal interruptions, they are for purposes of illustration only. The exemplary embodiments are not limited to the precise details and descriptions described herein. For example, although particular devices and structures are described, other devices and structures could be utilized according to the principles of the present invention. Various modifications may be made and the details disclosed without departing from the spirit of the invention as defined in the following claims.

What is claimed is:

1. An airplane guidance method involving an inertial reference system and a GPS landing system, the airplane guidance method comprising:

converting position coordinates of an aircraft from the inertial reference system to runway, lateral, and vertical coordinates;

calibrating runway distance and lateral distance based on the converted position coordinates from the inertial reference system using runway distance and lateral distance from the GPS landing system with a third-order calibration filter when the aircraft is below a first height above terrain;

calibrating vertical distance based on the converted position coordinates from the inertial reference system using vertical distance from the GPS landing system with a second-order calibration filter when the aircraft is below the first height above terrain; and using the calibrated runway, lateral, and vertical distances for deviation computations when GPS signals are interrupted below a second height above terrain.

2. The method of claim 1, further comprising determining a reference trajectory, the reference trajectory including horizontal and vertical positions, for the inertial reference system computed with velocity from the inertial reference system and initial position from the GPS landing system.

3. The method of claim 1, wherein the first height is 1500 feet.

4. The method of claim 1, wherein the third-order calibration filter converges when an error signal is within 0.15 m for 30 seconds.

5. The method of claim 1, wherein the second-order calibration filter converges when an error signal is within 0.2 m for 30 seconds.

6. The method of claim 1, further comprising generating airplane control signals based on the deviation computations.

7. The method of claim 1, wherein the GPS landing system comprises a ground station for generating differential global positioning system information.

8. The method of claim 1, wherein the velocity error state of the third-order calibration filter is initialized by velocity difference between velocity measurements in the GPS landing system and the inertial reference system.

9. The method of claim 1, further comprising buffering values from the GPS landing system and the inertial reference system before processing to ensure data integrity.

10. A method of deriving inertial-aided deviations for autoland systems during GPS signal interruptions, the method comprising:

generating global positioning positions;

generating inertial reference system positions; and generating calibrated positions based on the global positioning positions and the inertial reference system positions using a third-order calibration filter and a second-order calibration filter.

11. The method of claim 10, wherein the calibrated positions comprise runway distance, lateral distance, and aircraft height.

12. The method of claim 10, wherein a velocity error state of the third-order calibration filter is initialized by velocity difference between velocity measurements in a BPS landing system and an inertial reference system.

13. The method of claim 10, further comprising providing airplane control signals using deviation computations from the generated calibrated positions when the calibration filters converge.

14. The method of claim 13, wherein the third-order calibration filter converges when an error signal is within 0.15 m for 30 seconds.

15. The method of claim 13, wherein the second-order calibration filter converges when an error signal is within 0.2 m for 30 seconds.

16. The method of claim 13, wherein the airplane control signals are provided using deviation computation when GPS signals are interrupted.

17. The method of claim 16, wherein aircraft height is 200 feet or less.

18. A system for deriving inertial-aided deviations for autoland systems during GPS signal interruptions, the system comprising:

a first component for generating global positioning positions;

a second component for generating inertial reference system positions;

a third component for generating calibrated positions based on the global positioning positions and the inertial reference system positions using a third-order calibration filter and a second-order calibration filter; and a fourth component for providing airplane control signals using deviation computations from the generated calibrated positions when the calibration filters converge.

19. The system of claim 18, wherein the third-order calibration filter converges when an error signal is within 0.15 m for 30 seconds; and wherein the second-order calibration filter converges when an error signal is within 0.2 m for 30 seconds.

20. The system of claim 18, wherein the airplane control signals are provided using deviation computation when GPS signals are interrupted.

* * * * *